Patented July 30, 1935

2,009,692

UNITED STATES PATENT OFFICE 2,009,692

LAUNDRY STARCH AND METHOD OF USING THE SAME

Ralph E. Hall, Mount Lebanon, Pa., assignor to Hall Laboratories, Inc., Pittsburgh, Pa., a corporation of Pennsylvania No Drawing. Application April 19, 1934, Serial No. 721,317

9 Claims. (Cl. 134—19)

This invention relates to laundry starch and methods of using the same.

I have found that the starching properties of laundry starch can be improved by mixing therewith an alkali-metal hexa-metaphosphate, such, for example, as sodium hexa-metaphosphate. A suitable laundry starch solution according to the present invention may be made by adding approximately 1 qt. of a 25% solution of sodium hexa-metaphosphate to each 25 gal. of prepared starch solution. The starch may be applied by dipping the fabric into it or by starching machines. The starch to which the alkali-metal hexa-metaphosphate has been added gives a smoother, glossier finish of more uniform quality and appearance over the fabric which has been ironed.

Instead of adding a solution of the alkali-metal hexa-metaphosphate to a starch solution, a solid mixture of the starch and the alkali-metal hexa-metaphosphate may be made and this mixture dissolved in water to form the improved starch solution.

Starch alone is seldom used in laundry practice. It is customary to mix with the starch a starch glaze or gloss which may consist of borax alone or of mixtures of various substances including waxes, sulphonated bodies, borax, French chalk, soap, stearin, etc. When starch containing these glossing materials is added to hard water containing calcium and/or magnesium, there is a tendency for the calcium and magnesium to react with the glossing ingredients forming insoluble borates, carbonates and soaps. These precipitates tend to prevent the proper penetration and adherence of the starch to the fabric.

Where, however, the starch contains an alkali-metal hexa-metaphosphate, for example, sodium hexa-metaphosphate, the precipitates of calcium and magnesium are prevented or at least decreased due to the solubility of the calcium and magnesium salts in the hexa-metaphosphate. The action of the alkali-metal hexa-metaphosphate is to sequester the calcium and magnesium in the hard water in the form of very slightly ionized soluble complexes, thus preventing the precipitation of insoluble calcium and magnesium salts and allowing the starch better access to the fabric.

The alkali-metal hexa-metaphosphate also has a dissolving effect on calcium and magnesium soaps which may be present on the fabric due to previously washing the fabric in hard water. The removal of the previously deposited insoluble soaps increases the penetration of the starch into the fabric.

It is customary in certain types of starch preparations to use materials which will render the fabrics non-inflammable. Among such materials which may be mixed with the starch are aluminum sulphate, ammonium sulphate, and ammonium phosphate. The tendency of these salts to be precipitated by the calcium and magnesium in the water as calcium and magnesium sulphates and phosphates is overcome or decreased by the use of an alkali-metal hexa-metaphosphate with the starch. These precipitates, if present, would decrease the penetration of the starch into the fiber, as previously described.

The improved starch containing the alkali-metal hexa-metaphosphate is more easily spread on the goods and gives a more uniform finish in the ironed fabric than starch not containing the hexa-metaphosphate.

The alkali-metal hexa-metaphosphate which I prefer to use is the soluble sodium hexa-metaphosphate sometimes called "Graham's salt". The sodium hexametaphosphate is assumed to be a complex of the general formula

$$Na_2(Na_4P_6O_{18}),$$

although some authorities believe that salts of the formulas $Na_5(NaP_6O_{18})$ and $Na_4(Na_2P_6O_{18})$ may also be present. Sodium hexametaphosphate in readily soluble form may be prepared by strongly heating monosodium dihydrogen orthophosphate, and rapidly cooling the molten mass. The quick cooling is apparently essential to the formation of a readily soluble salt. Upon slower cooling of the molten mass, there is a tendency to form other sodium metaphosphates, such as sodium trimetaphosphate which is soluble, but which does not have the property of dissolving calcium or magnesium, and sodium mono-metaphosphate which is difficultly soluble. I prefer to cool the mass sufficiently rapidly so that the product is obtained principally in the form generally accepted as sodium hexametaphosphate. I prefer to prepare the hexametaphosphate so that it contains a few per cent of pyrophosphate. This may be done by admixture of a small amount of disodium monohydrogen orthophosphate with the monosodium dihydrogen orthophosphate before the heating. When I speak of hexa-metaphosphate therefore, I mean either the pure hexa-metaphosphate or hexa-metaphosphate containing a few per cent of pyrophosphate.

While I prefer to use the sodium hexa-metaphosphate, other alkali-metal hexa-metaphosphates may be used, such, for example, as potassium hexa-metaphosphate, lithium hexa-metaphosphate, and ammonium hexa-metaphosphate.

I have referred in the specification and claims to a starch solution. It is to be understood that it is intended to include not only true solutions, but suspensions as well, but I have referred to the product formed by adding starch to water as a starch solution because that is the term which is generally employed.

I have described a preferred starch solution, but it is to be understood that the proportions of starch and alkali-metal hexa-metaphosphate may be varied and that the invention may be otherwise embodied or practiced within the scope of the following claims.

I claim:

1. Laundry starch containing an alkali-metal hexa-metaphosphate.

2. Laundry starch containing sodium hexa-metaphosphate.

3. A starch solution containing an alkali-metal hexa-metaphosphate.

4. An aqueous starch solution containing an alkali-metal hexa-metaphosphate.

5. A starch solution containing sodium hexa-metaphosphate.

6. The method of starching textile material which comprises treating it with a starch solution containing an alkali-metal hexa-metaphosphate.

7. The method of starching textile material which comprises treating it with a starch solution containing sodium hexa-metaphosphate.

8. A substantially dry starch preparation containing an alkali-metal hexametaphosphate.

9. A substantially dry starch preparation containing sodium hexametaphosphate.

RALPH E. HALL.